United States Patent
Shimoda

(10) Patent No.: US 10,172,371 B2
(45) Date of Patent: *Jan. 8, 2019

(54) GREEN TEA EXTRACT COMPOSITION

(71) Applicant: KAO CORPORATION, Tokyo (JP)

(72) Inventor: Yuichi Shimoda, Ichikawa (JP)

(73) Assignee: KAO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/569,801

(22) PCT Filed: Jan. 29, 2016

(86) PCT No.: PCT/JP2016/052720
§ 371 (c)(1),
(2) Date: Oct. 27, 2017

(87) PCT Pub. No.: WO2016/174888
PCT Pub. Date: Nov. 3, 2016

(65) Prior Publication Data
US 2018/0132502 A1 May 17, 2018

(30) Foreign Application Priority Data
Apr. 28, 2015 (JP) .................... 2015-092122

(51) Int. Cl.
*A23F 3/38* (2006.01)
*A23F 3/16* (2006.01)
*A23F 3/22* (2006.01)
*A23F 3/30* (2006.01)

(52) U.S. Cl.
CPC . *A23F 3/30* (2013.01); *A23F 3/16* (2013.01)

(58) Field of Classification Search
CPC ............... A61K 2300/00; A61K 36/82; A23V 2002/00; A23V 2250/21; A23V 2250/214; A23V 2250/2132; A23V 2250/2116; A23V 2250/606; A23V 2200/30; A23V 2250/1592; A23L 33/105; A23L 2/52; A23L 2/60; A23L 27/84; A23L 2/39; A23L 33/145; A23F 3/163; A23F 3/30; A23F 3/16; A23F 3/14; A23F 3/40
USPC ...... 426/597, 590, 548, 72, 655, 435, 330.3, 426/49
See application file for complete search history.

(56) References Cited

U.S. PATENT DOCUMENTS

| | | |
|---|---|---|
| 5,879,733 A | 3/1999 | Ekanayake et al. |
| 2006/0057261 A1 | 3/2006 | Ogura et al. |
| 2007/0048430 A1 | 3/2007 | Konishi et al. |
| 2009/0123612 A1 | 5/2009 | Takatsu et al. |
| 2010/0143554 A1 | 6/2010 | Fukuda et al. |
| 2010/0316770 A1 | 12/2010 | Fukuda et al. |
| 2012/0121761 A1 | 5/2012 | Fukuda et al. |

FOREIGN PATENT DOCUMENTS

| | | |
|---|---|---|
| JP | 2001-197863 A | 7/2001 |
| JP | 2001-245591 A | 9/2001 |
| JP | 2005-58210 A | 3/2005 |
| JP | 2007-89576 A | 4/2007 |
| JP | 2007-325585 A | 12/2007 |
| JP | 2008-178397 A | 8/2008 |
| JP | 2008-301808 A | 12/2008 |
| JP | 2010-11858 A | 1/2010 |
| JP | 2012-115229 A | 6/2012 |
| JP | 5153319 B2 | 2/2013 |
| JP | 2014-96994 A | 5/2014 |
| JP | 2015-109829 A | 6/2015 |
| KR | 10-2009-0102757 A | 9/2009 |
| WO | 2004/037022 A1 | 5/2004 |
| WO | 2009/019876 A1 | 2/2009 |

OTHER PUBLICATIONS

Mitscher, Lester A. and Victoria Dolby, The Green Tea Book: China's Fountain of Youth, Avery Publishing Group, pp. 47 (Year: 1998).*
International Search Report dated Apr. 5, 2016 in PCT/JP2016/052720 filed Jan. 29, 2016.

* cited by examiner

*Primary Examiner* — Hong T Yoo
(74) *Attorney, Agent, or Firm* — Oblon, McClelland, Maier & Neustadt, L.L.P.

(57) ABSTRACT

Provided is a green tea extract composition, including the following components (A), (B), (C), (D), and (E): (A) non-polymer catechins; (B) a sugar; (C) iron; (D) caffeine; and (E) gallic acid, in which a content of the non-polymer catechins (A) is from 25 mass % to 45 mass %; a content of the sugar (B) is from 4 mass % to 13 mass %; a mass ratio between the sugar (B) and the caffeine (D), [(D)/(B)], is from 0.2 to 0.8; a mass ratio between the gallic acid (E) and the iron (C), [(E)/(C)], is from 55 to 2,500; and (F) a water content is 10 mass % or less.

9 Claims, No Drawings

GREEN TEA EXTRACT COMPOSITION

FIELD OF THE INVENTION

The present invention relates to a green tea extract composition.

BACKGROUND OF THE INVENTION

In general, a green tea extract containing a soluble tea component is formed by extracting tea leaves with hot water or cold water. A concentrated green tea extract or a purified green tea extract is formed by concentrating or purifying the green tea extract, and is generally stored in a frozen, refrigerated, or dried state.

For example, as a purified tea extract having improved oral feeling and aftertaste, there is known a purified tea extract having a purity of non-polymer catechins in its solids of 50 mass % or more, a content of magnesium in solids of 300 mg/kg or less, and a mass ratio between magnesium and manganese (manganese/magnesium) in solids of 0.25 or less (Patent Document 1). In addition, as a green tea extract having improved clarity and color, there is known a green tea extract characterized by containing specific amounts of a catechin mixture, theanine, and calcium, magnesium, manganese, aluminum, zinc, and iron ions (Patent Document 2).

[Patent Document 1] JP-A-2012-115229
[Patent Document 2] JP-A-2001-197863

SUMMARY OF THE INVENTION

The present invention provides a green tea extract composition, comprising the following components (A), (B), (C), (D), and (E): (A) non-polymer catechins; (B) a sugar; (C) iron; (D) caffeine; and (E) gallic acid, in which a content of the non-polymer catechins (A) is from 25 mass % to 45 mass %; a content of the sugar (B) is from 4 mass % to 13 mass %; a mass ratio between the sugar (B) and the caffeine (D), [(D)/(B)], is from 0.2 to 0.8; a mass ratio between the gallic acid (E) and the iron (C), [(E)/(C)], is from 55 to 2,500; and (F) a water content is 10 mass % or less, a packaged beverage comprising the green tea extract composition, and an instant beverage powder comprising the green tea extract composition.

DETAILED DESCRIPTION OF THE INVENTION

The inventor of the present invention found that a green tea extract composition, when stored for a long period of time without being frozen or refrigerated, undergoes different phenomena depending on its water content: the green tea extract composition becomes dark when the water content is high, whereas the green tea extract composition becomes reddish when the water content is low. The present invention relates to a green tea extract composition hardly exhibiting a change in color during storage and having reduced unpleasant taste and flavor, such as dry rough tongue and harshness.

The inventor of the present invention found that a green tea extract composition hardly exhibiting a change in color during storage and having reduced unpleasant taste and flavor, such as dry rough tongue and harshness, is obtained by controlling, to specific amounts, the respective contents of non-polymer catechins and a specific component contained in the green tea extract composition, a quantitative ratio between the specific component and caffeine, a quantitative ratio between the specific component and a specific metal, and a water content.

According to the present invention, there can be provided a green tea extract composition hardly exhibiting a change in color during storage and having reduced unpleasant taste and flavor, such as dry rough tongue and harshness, and reduced foreign taste that is unlikely in green tea. Further, the green tea extract composition of the present invention is useful as a material for producing an easy-to-drink beverage without any unpleasant feeling by virtue of reduced unpleasant taste and flavor, such as dry rough tongue and harshness, and reduced foreign taste that is unlikely in green tea.

[Green Tea Extract Composition]

In the green tea extract composition of the present invention, the content of non-polymer catechins (A), which is from 25 mass % to 45 mass %, is preferably 27 mass % or more, more preferably 30 mass % or more, even more preferably 32 mass % or more, from the viewpoints of maintenance of the taste and flavor of tea, and a physiological effect, and is more preferably 43 mass % or less, more preferably 40 mass % or less, even more preferably 38 mass % or less, from the viewpoints of reductions in unpleasant taste and flavor, such as dry rough tongue and harshness, and suppression of a change in color. The content of the non-polymer catechins (A) in the green tea extract composition falls within the range of preferably from 27 mass % to 43 mass %, more preferably from 30 mass % to 40 mass %, even more preferably from 32 mass % to 38 mass %. As used herein, the term "non-polymer catechins" is a collective term encompassing gallate forms including epigallocatechin gallate, gallocatechin gallate, epicatechin gallate, and catechin gallate, and non-gallate forms including epigallocatechin, gallocatechin, epicatechin, and catechin. The content of the non-polymer catechins is defined on the basis of the total amount of the above-mentioned eight kinds, and in the present invention, at least one kind out of the eight kinds of non-polymer catechins only needs to be contained. The content of the component (A) may be measured by an analysis method suitable for the situation of a measurement sample among generally known analysis methods for non-polymer catechins. For example, the content of the component (A) may be analyzed by a liquid chromatography method, and specifically may be analyzed by a method described in Examples to be described later. In the measurement, the sample may be subjected to appropriate treatment involving, for example, freeze-drying the sample so as to match the sample with a detection region of a device or removing foreign substances in the sample so as to match the sample with the resolution of the device, as necessary.

In the green tea extract composition of the present invention, the ratio of the gallate forms in the non-polymer catechins is preferably 57 mass % or less, more preferably 55 mass % or less, more preferably 53 mass % or less, even more preferably 51 mass % or less, from the viewpoints of reductions in unpleasant taste and flavor, such as dry rough tongue and harshness, and is preferably 10 mass % or more, more preferably 15 mass % or more, more preferably 30 mass % or more, more preferably 35 mass % or more, even more preferably 40 mass % or more, from the viewpoints of maintenance of the taste and flavor of tea, and a physiological effect. The ratio of the gallate forms falls within the range of preferably from 10 mass % to 57 mass %, preferably from 15 mass % to 57 mass %, more preferably from 30 mass % to 57 mass %, more preferably from 35 mass % to 55 mass %, more preferably from 35 mass % to 53 mass %, even more preferably from 40 mass % to 51 mass %. As used herein, the term "ratio of gallate forms in the non-polymer catechins" refers to the mass ratio of the above-mentioned four kinds of gallate forms to the eight kinds of non-polymer catechins.

In addition, in the green tea extract composition of the present invention, the content of a sugar (B), which is from 4 mass % to 13 mass %, is preferably 4.5 mass % or more, more preferably 5 mass % or more, even more preferably 5.5 mass % or more, from the viewpoint of suppression of a change in color ($\Delta L^*$), and is preferably 12 mass % or less, more preferably 10 mass % or less, even more preferably 7.5 mass % or less, from the viewpoints of maintenance of the taste and flavor of tea, suppression of a change in color ($\Delta a^*$), and reductions in unpleasant taste and flavor, such as dry rough tongue. The content of the sugar (B) in the green tea extract composition falls within the range of preferably from 4.5 mass % to 12 mass %, more preferably from 5 mass % to 10 mass %, even more preferably from 5.5 mass % to 7.5 mass %. As used herein, the term "sugar" is a collective term encompassing glucose, fructose, and sucrose. The content of the sugar (B) is defined on the basis of the total amount of the above-mentioned three kinds, and in the present invention, at least one kind out of the above-mentioned three kinds only needs to be contained. The content of the component (B) may be measured by an analysis method suitable for the situation of a measurement sample among generally known analysis methods for a sugar. For example, the content of the component (B) may be analyzed by a liquid chromatography method, and specifically may be analyzed by a method described in Examples to be described later. In the measurement, the sample may be subjected to appropriate treatment involving, for example, freeze-drying the sample so as to match the sample with a detection region of a device or removing foreign substances in the sample so as to match the sample with the resolution of the device, as necessary.

In the green tea extract composition of the present invention, a mass ratio between the non-polymer catechins (A) and the sugar (B), [(B)/(A)], is preferably 0.1 or more, more preferably 0.11 or more, even more preferably 0.12 or more, from the viewpoints of reductions in unpleasant taste and flavor, such as dry rough tongue and harshness, and suppression of a change in color ($\Delta L^*$), and is preferably 0.5 or less, more preferably 0.25 or less, even more preferably 0.23 or less, from the viewpoints of maintenance of the taste and flavor of tea, reductions in unpleasant taste and flavor, such as dry rough tongue, and suppression of a change in color ($\Delta a^*$). The mass ratio [(B)/(A)] falls within the range of preferably from 0.1 to 0.5, more preferably from 0.11 to 0.25, even more preferably from 0.12 to 0.23.

In addition, in the green tea extract composition of the present invention, from the viewpoints of suppression of a change in color, reductions in unpleasant taste and flavor, such as dry rough tongue and harshness, and reductions in foreign taste that is unlikely in green tea, the content of iron (C) is preferably 0.00005 mass % or more, more preferably 0.00008 mass % or more, even more preferably 0.00009 mass % or more, and is preferably 0.006 mass % or less, more preferably 0.005 mass % or less, even more preferably 0.004 mass % or less. The content of the iron (C) in the green tea extract composition falls within the range of preferably from 0.00005 mass % to 0.006 mass %, more preferably from 0.00008 mass % to 0.005 mass %, even more preferably from 0.00009 mass % to 0.004 mass %. In this context, the "iron" contained in the green tea extract composition includes iron in a nonionic state and iron in a dissociated state, and the dissociated iron includes a divalent iron ion and a trivalent iron ion. The content of the iron (C) is defined on the basis of the total amount of the iron in a nonionic state and the iron in a dissociated state, and in the present invention, at least one kind out of the above-mentioned three kinds only needs to be contained. In addition, the content of the component (C) may be measured by an analysis method suitable for the situation of a measurement sample among generally known analysis methods for iron. For example, the content of the component (C) may be analyzed by an atomic absorption analysis method, and specifically may be analyzed by a flame method or inductively-coupled plasma emission spectrometry, as well as a graphite furnace method described in Examples to be described later. In the measurement, the sample may be subjected to appropriate treatment involving, for example, freeze-drying the sample so as to match the sample with a detection region of a device or removing foreign substances in the sample so as to match the sample with the resolution of the device, as necessary.

In the green tea extract composition of the present invention, a mass ratio between the sugar (B) and the iron (C), [(C)/(B)], is preferably 0.00008 or more, more preferably 0.0001 or more, more preferably 0.00015 or more, even more preferably 0.0002 or more, and is preferably 0.0008 or less, more preferably 0.0007 or less, more preferably 0.0006 or less, even more preferably 0.0005 or less, from the viewpoints of suppression of a change in color, reductions in unpleasant taste and flavor, such as dry rough tongue and harshness, and reductions in foreign taste that is unlikely in green tea. The mass ratio [(C)/(B)] falls within the range of preferably from 0.00008 to 0.0008, more preferably from 0.0001 to 0.0007, more preferably from 0.00015 to 0.0006, even more preferably from 0.0002 to 0.0005.

The green tea extract composition of the present invention further comprises caffeine (D). In the green tea extract composition of the present invention, the content of the caffeine (D) is preferably 2 mass % or more, more preferably 2.5 mass % or more, even more preferably 3 mass % or more, from the viewpoint of maintenance of the taste and flavor of tea, and is preferably 6 mass % or less, more preferably 5.5 mass % or less, more preferably 5 mass % or less, even more preferably 4 mass % or less, from the viewpoints of suppression of a change in color ($\Delta a^*$), and reductions in unpleasant taste and flavor, such as dry rough tongue. The content of the caffeine (D) in the green tea extract composition falls within the range of preferably from 2 mass % to 6 mass %, more preferably from 2.5 mass % to 5.5 mass %, more preferably from 3 mass % to 5 mass %, even more preferably from 3 mass % to 4 mass %. In addition, the content of the component (D) may be measured by an analysis method suitable for the situation of a measurement sample among generally known analysis methods for caffeine. For example, the content of the component (D) may be analyzed by a liquid chromatography method, and specifically may be analyzed by a method described in Examples to be described later. In the measurement, the sample may be subjected to appropriate treatment involving, for example, removing foreign substances in the sample so as to match the sample with the resolution of a device, as necessary.

In the green tea extract composition of the present invention, a mass ratio between the non-polymer catechins (A) and the caffeine (D), [(D)/(A)], is preferably 0.04 or more, more preferably 0.06 or more, more preferably 0.08 or more, even more preferably 0.086 or more, from the viewpoint of suppression of a change in color ($\Delta L^*$), and is preferably 0.17 or less, more preferably 0.15 or less, more preferably 0.14 or less, even more preferably 0.11 or less, from the viewpoints of suppression of a change in color (Δa*), and reductions in unpleasant taste and flavor, such as dry rough tongue. The mass ratio [(D)/(A)] falls within the range of preferably from 0.04 to 0.17, more preferably from 0.06 to 0.15, more preferably from 0.08 to 0.13, even more preferably from 0.086 to 0.11.

In addition, in the green tea extract composition of the present invention, a mass ratio between the sugar (B) and the caffeine (D), [(D)/(B)], which is from 0.2 to 0.8, is preferably 0.23 or more, more preferably 0.25 or more, more preferably 0.3 or more, even more preferably 0.35 or more, and is preferably 0.79 or less, more preferably 0.78 or less, more preferably 0.77 or less, more preferably 0.76 or less, more preferably 0.75 or less, even more preferably 0.7 or less, from the viewpoints of suppression of a change in color, reductions in unpleasant taste and flavor, such as dry rough tongue and harshness, and reductions in foreign taste that is unlikely in green tea. The mass ratio [(D)/(B)] falls within the range of preferably from 0.23 to 0.79, more preferably from 0.25 to 0.78, more preferably from 0.3 to 0.77, more preferably from 0.35 to 0.76, more preferably from 0.35 to 0.75, even more preferably from 0.35 to 0.7.

In addition, in the green tea extract composition of the present invention, a mass ratio between the iron (C) and the caffeine (D), [(C)/(D)], is preferably 0.00003 or more, more preferably 0.00005 or more, more preferably 0.0001 or more, even more preferably 0.0002 or more, and is preferably 0.002 or less, more preferably 0.0017 or less, more preferably 0.0014 or less, even more preferably 0.0011 or less, from the viewpoints of suppression of a change in color, reductions in unpleasant taste and flavor, such as dry rough tongue and harshness, and reductions in foreign taste that is unlikely in green tea. The mass ratio [(C)/(D)] falls within the range of preferably from 0.00003 to 0.002, more preferably from 0.00005 to 0.0017, more preferably from 0.0001 to 0.0014, even more preferably from 0.0002 to 0.0011.

The green tea extract composition of the present invention further comprises gallic acid (E). In the green tea extract composition of the present invention, the content of the gallic acid (E) is preferably 0.05 mass % or more, more preferably 0.1 mass % or more, even more preferably 0.12 mass % or more, from the viewpoints of suppression of a change in color (Δa*), and reductions in unpleasant taste and flavor, such as dry rough tongue, and is preferably 7 mass % or less, more preferably 5 mass % or less, more preferably 4 mass % or less, even more preferably 3 mass % or less, from the viewpoint of maintenance of the taste and flavor of tea. The content of the gallic acid (E) in the green tea extract composition falls within the range of preferably from 0.05 mass % to 7 mass %, more preferably from 0.05 mass % to 5 mass %, more preferably from 0.1 mass % to 4 mass %, even more preferably from 0.12 mass % to 3 mass %. In addition, the content of the component (E) may be measured by an analysis method suitable for the situation of a measurement sample among generally known analysis methods for gallic acid. For example, the content of the component (E) may be analyzed by a liquid chromatography method, and specifically may be analyzed by a method described in Examples to be described later. In the measurement, the sample may be subjected to appropriate treatment involving, for example, removing foreign substances in the sample so as to match the sample with the resolution of a device, as necessary.

In the green tea extract composition of the present invention, a mass ratio between the gallic acid (E) and the iron (C), [(E)/(C)], which is from 55 to 2,500, is preferably 60 or more, more preferably 65 or more, more preferably 70 or more, more preferably 80 or more, more preferably 100 or more, more preferably 150 or more, even more preferably 250 or more, from the viewpoints of suppression of a change in color (Δa*), and reductions in unpleasant taste and flavor, such as dry rough tongue, and is preferably 2,000 or less, more preferably 1,500 or less, even more preferably 1,000 or less, from the viewpoint of maintenance of the taste and flavor of tea. The mass ratio [(E)/(C)] falls within the range of preferably from 60 to 2,000, more preferably from 65 to 1,500, more preferably from 70 to 1,000, more preferably from 80 to 1,000, more preferably from 100 to 1,000, more preferably from 150 to 1,000, even more preferably from 250 to 1,000.

A water content (F) in the green tea extract composition of the present invention, which is 10 mass % or less, is more preferably 8 mass % or less, more preferably 5 mass % or less, from the viewpoint of suppression of a change in color during storage. When the water content (F) is 5 mass % or less, the green tea extract composition of the present invention has the form of powder, and hence can have enhanced storage stability as well as an excellent handling property. The lower limit value of the water content (F) of the green tea extract composition of the present invention is preferably 0.1 mass % or more, more preferably 1.5 mass % or more, from the viewpoints of reductions in unpleasant taste and flavor, such as dry rough tongue and harshness. Specifically, the water content (F) may be analyzed by a reduced-pressure drying method or a Karl Fischer titration method, as well as an ordinary-pressure drying method described in Examples to be described later.

In addition, in the green tea extract composition of the present invention, a change in color during storage is suppressed. Specifically, the absolute value (ΔL*) of a difference between the L* value of the green tea extract composition after storage at 65° C. for 2 days and the L* value of the green tea extract composition before the start of the storage (for example, immediately after product may be set to preferably less than 10, more preferably less than 9, more preferably less than 8, even more preferably less than 7.5. In addition, the absolute value (Δa*) of a difference between the a* value of the green tea extract composition after storage at 65° C. for 2 days and the a* value of the green tea extract composition before the start of the storage (for example, immediately after production) may be set to preferably 5 or less, more preferably 4 or less, more preferably 3 or less, even more preferably 2 or less. In this context, the "L* value" is L* representing lightness in the expression of a color in an L*a*b* color system. In addition, the "a* value" is a coordinate value representing hue and chroma in the expression of a color in the L*a*b* color system, and is a coordinate value representing chroma in a red direction. The L*a*b* color system also uses b*, which is a coordinate value representing chroma in a yellow direction, but in the present invention, L* and a*, which are most likely to manifest when the green tea extract composition undergoes a change in color, are specified. The changes in color (ΔL*) and (Δa*) are measured in accordance with the description of "Measurement of Change in Hue" in Examples to be described later.

A production method for the green tea extract composition of the present invention may be any method as long as a green tea extract composition to be obtained can have the above-mentioned configuration. For example, such a green tea extract composition that the respective contents of the non-polymer catechins and the sugar contained in the green tea extract composition, the quantitative ratio between the sugar and each of the iron and the caffeine, the quantitative ratio between the gallic acid and the iron, and the water content are controlled to specific amounts may be produced by bringing hot water into contact with surfaces of raw tea leaves, then extracting the tea leaves with water, subjecting the resultant green tea extract solution to solid-liquid separation, and subjecting the resultant green tea extract solution to tannase treatment as necessary, followed by concentration or drying so as to achieve a water content of 10 mass % or less. As used herein, the term "tannase treatment" refers to bringing the green tea extract solution into contact with an enzyme having tannase activity. Through the tannase treatment, the gallate forms in the non-polymer catechins in the green tea extract solution are decomposed to liberate gallic acid.

(Raw Tea Leaves)

As used herein, the term "raw tea leaves" refers to tea leaves after plucking and before heat treatment, or tea leaves stored in a refrigerated or frozen state after plucking and before heat treatment. In addition, tea leaves as plucked (full leaves) are generally used as the raw tea leaves to be used in the present invention. Further, stems may be used as well as the tea leaves.

The raw tea leaves are not particularly limited as long as the raw tea leaves are from a generally cultivated tea variety, and one kind or two or more kinds may be appropriately selected and used. With regard to the harvest season of the tea leaves, any one of first-picked tea, second-picked tea, third-picked tea, and fourth-picked tea is permitted. In addition, as a plucking method, there may be given, for example, two-leaf picking, three-leaf picking, and normal picking.

(Hot Water Treatment)

The kind of the hot water is not particularly limited, and for example, tap water, distilled water, ion-exchanged water, or natural water may be appropriately selected and used.

In addition, the temperature of the hot water is preferably from 60° C. to 99° C., more preferably from 70° C. to 97° C., even more preferably from 80° C. to 95° C., from the viewpoints of suppression of changes in color ($\Delta a^*$ and $\Delta L^*$), reductions in unpleasant taste and flavor, such as dry rough tongue and harshness, and reductions in foreign taste that is unlikely in green tea.

A method for the contact is not particularly limited as long as the surfaces of the raw tea leaves can be brought into contact with the hot water, and examples thereof may include a method involving immersing the raw tea leaves in the hot water, and a method involving supplying the raw tea leaves with the hot water in the form of a shower.

The amount of the hot water may be appropriately selected depending on the contact method and the scale of production. From the viewpoints of suppression of changes in color ($\Delta a^*$ and $\Delta L^*$), reductions in unpleasant taste and flavor, such as dry rough tongue and harshness, and reductions in foreign taste that is unlikely in green tea, a mass ratio between the water and the raw tea leaves (water/raw tea leaves) is preferably from 5 to 40, more preferably from 5 to 35, even more preferably from 5 to 30, and the contact time with the hot water is preferably from 10 seconds to 300 seconds, more preferably from 30 seconds to 270 seconds, more preferably from 120 seconds to 240 seconds, even more preferably from 130 seconds to 240 seconds.

After the hot water treatment, water remaining on the surfaces of the tea leaves may be removed by shaking or the like, or may be lightly wiped off with waste cloth, paper, or the like. In addition, the tea leaves after the hot water treatment may be dried.

In addition, before the extraction, the tea leaves may be subjected to, for example, CTC processing, cutting treatment, or pulverization treatment to enhance the extraction efficiency of the non-polymer catechins. As used herein, the term "CTC processing" refers to processing in which crushing, tearing, and curling are performed at once, and the CTC processing may be performed using a CTC processing apparatus. The CTC processing is processing to be used before fermentation in the production of black tea, and is not generally performed for the processing of tea leaves that does not involve any fermentation. In the present invention, a step of rubbing tea leaves, such as rolling, is not necessarily needed.

(Extraction)

A known method, such as stirring extraction, column extraction, or drip extraction, may be adopted as a method for the extraction.

The temperature of the water to be used in the extraction is preferably from 25° C. to 100° C., more preferably from 50° C. to 98° C., even more preferably from 55° C. to 92° C., from the viewpoint of the extraction efficiency of the non-polymer catechins.

In addition, the water to be used may be water similar to those described above, and of those, ion-exchanged water is preferred in terms of taste.

The amount of the water may be appropriately selected depending on the extraction method, and for example, the mass ratio between the water and the raw tea leaves (water/raw tea leaves=bath ratio) is preferably from 1 to 90, more preferably from 2 to 85, even more preferably from 3 to 80. In addition, a period of time for which the extraction is performed varies depending on the scale and the like, but is, for example, preferably from 5 minutes to 60 minutes, more preferably from 10 minutes to 40 minutes.

(Solid-Liquid Separation)

After the extraction, the resultant green tea extract solution is subjected to the solid-liquid separation.

For the solid-liquid separation, for example, centrifugation, filtration, or membrane treatment may be appropriately selected, and one kind or a combination of two or more kinds thereof may be performed. Of those, from the viewpoint that the effects of the present invention are significantly exhibited, membrane treatment is preferred, and treatment with a microfiltration membrane (MF membrane) is more preferred.

For the centrifugation, a general device of, for example, a separation plate type, a cylinder type, or a decanter type may be used. Conditions for the centrifugation are as described below. A temperature is preferably from 5° C. to 70° C., more preferably from 10° C. to 40° C. The number of revolutions and a period of time are, for example, in the case of the separation plate type, preferably from 4,000 rpm to 10,000 rpm, more preferably from 5,000 rpm to 10,000 rpm, even more preferably from 6,000 rpm to 10,000 rpm, and preferably from 0.2 minute to 30 minutes, more preferably from 0.2 minute to 20 minutes, even more preferably from 0.2 minute to 15 minutes, respectively.

For the filtration, for example, filter separation with filter paper, a filter made of a metal, such as stainless steel, or the like may be adopted. The mesh size of the filter made of a metal is, for example, from 18 mesh to 300 mesh.

Conditions for the membrane treatment are, for example, as described below. A temperature is preferably from 5° C. to 70° C., more preferably from 10° C. to 60° C. A pressure condition is preferably from 30 kPa to 400 kPa, more preferably from 50 kPa to 350 kPa. A membrane pore size is preferably from 0.1 μm to 10 μm, more preferably from 0.2 μm to 5 μm. A measurement method for the membrane pore size is exemplified by a general measurement method involving using a mercury intrusion method, a bubble point test, a bacterial filtration method, or the like, and it is preferred to use a value determined by a bubble point test.

For example, a hydrocarbon-based polymer, a fluorinated hydrocarbon-based polymer or a fluorinated sulfone-based polymer, and a ceramic are given as a material for the membrane. In addition, for example, a flat membrane, a spiral membrane, a hollow fiber membrane, a monolith-type membrane, and a pencil-type membrane are given as a form of the membrane.

(Tannase Treatment)

After the solid-liquid separation, the resultant separated liquid may be subjected to the tannase treatment.

It is only necessary that tannase have activity of hydrolyzing the gallate forms in the non-polymer catechins. Specifically, enzymes obtained by culturing tannase-producing microbes, such as *Aspergillus, Penicillium*, and *Rhizopus*, may be used. Of those, an enzyme derived from *Aspergillus oryzae* is more preferred. As a commercially available product of the enzyme having tannase activity, there may be utilized, for example, pectinase PL Amano (manufactured by Amano Enzyme Inc.), hemicellulase Amano 90 (manufactured by Amano Enzyme Inc.) tannase KTFH (manufactured by Kikkoman Corporation), tannase KT05 (manufactured by Kikkoman Corporation), or tannase KT50 (manufactured by Kikkoman Corporation).

It is preferred that the tannase to be used in the present invention have an enzyme activity of from 500 U/g to 100,000 U/g. When the tannase has an enzyme activity of 500 U/g or more, the treatment can be performed within a time period having no industrial problems. When the tannase has an enzyme activity of 100,000 U/g or less, a reaction system can be controlled. As used herein, the term "1 Unit" refers to an enzyme amount for hydrolyzing 1 micromole of an ester bond contained in tannic acid in water at 30° C.

In the tannase treatment, the tannase is added to the non-polymer catechins in the green tea extract so that its content may fall within the range of preferably from 0.5 mass % to 10 mass %, more preferably from 1.0 mass % to 10 mass %. The temperature of the tannase treatment is preferably from 15° C. to 40° C., more preferably from 20° C. to 30° C., at which enzyme activity is obtained. The pH (25° C.) at the time of the tannase treatment is preferably from 4 to 6, more preferably from 4.5 to 6, even more preferably from 5 to 6, at which enzyme activity is obtained. After that, the temperature is raised to from 45° C. to 95° C., preferably from 75° C. to 95° C. as quickly as possible to deactivate the tannase, to thereby stop the reaction. Through the deactivation treatment of the tannase, a later decrease in ratio of the gallate forms can be prevented, and a green tea extract comprising non-polymer catechins having the gallate forms in an intended ratio is obtained.

(Concentration/Drying)

Examples of the form of the green tea extract composition include various forms, such as a liquid, a slurry, a semi-solid, and a solid. In the case where a liquid is desired as the product form of the green tea extract composition, for example, the green tea extract composition may be concentrated by reduced-pressure concentration, reverse osmosis membrane concentration, or the like, and a specific example of the reduced-pressure concentration may be an evaporator. In addition, in the case where powder is desired, for example, the green tea extract composition may be powdered by being dried through spray drying, freeze-drying, or the like, and the drying may be performed in combination with concentration. In any of the forms, the water content is adjusted so as to be as described above.

[Packaged Beverage]

A packaged beverage of the present invention comprises the above-mentioned green tea extract composition.

The blending amount of the green tea extract composition in the beverage may be appropriately selected, and for example, the green tea extract composition may be blended so that the content of the non-polymer catechins (A) in the packaged beverage may be preferably from 0.1 mass %, to 0.3 mass %, more preferably from 0.12 mass % to 0.2 mass %. In this case, dilution may be performed with water, another tea extract, or the like so as to achieve a desired amount of the non-polymer catechins.

Examples of the water include the same types of water as those described above, and of those, ion-exchanged water is preferred in terms of taste. The pH (25° C.) of the packaged beverage is preferably from 2 to 7, more preferably from 2.5 to 6.5, even more preferably from 3 to 6.

The packaged beverage of the present invention may be a tea beverage or a non-tea-based beverage. Examples of the tea beverage include a green tea beverage, an oolong tea beverage, and a black tea beverage. In addition, examples of the non-tea-based beverage include: green tea extract composition-containing non-alcohol beverages, such as a fruit juice, a vegetable juice, a sports beverage, an isotonic beverage, enhanced water, bottled water, near water, a coffee beverage, an energy drink, and a drink for beauty; and green tea extract composition-containing alcohol beverages, such as beer, wine, Japanese sake, a plum liquor, a sparkling liquor, whisky, brandy, a clear liquor, rum, gin, and a liqueur. The form of the beverage is not particularly limited, and may be any of liquid, gel, or slurry forms and the like as long as the form is easily consumed.

The packaged beverage of the present invention may further comprise one kind or a combination of two or more kinds of additives, such as a flavor, a vitamin, a mineral, an antioxidant, various esters, pigments, an emulsifier, a preservative, a seasoning, an acidulant, a fruit juice extract, a vegetable extract, a nectar extract, and a quality stabilizer. The content of each of those additives may be appropriately set to the extent that the object of the present invention is not impaired.

In addition, the packaged beverage of the present invention may be provided by being filled into a general packaging container, such as a molded container mainly formed of polyethylene terephthalate (so-called PET bottle), a metal can, a paper container composited with a metal foil or a plastic film, or a bottle.

In addition, the packaged beverage of the present invention may be subjected to heat sterilization, and a method for the heat sterilization is not particularly limited as long as the method complies with a condition specified by an applicable regulation (Food Sanitation Act in Japan). Examples of the method may include a retort sterilization method, a high-temperature short-time sterilization method (HTST method), and an ultrahigh-temperature sterilization method (UHT method). In addition, the method for the heat sterilization may be appropriately selected depending on the kind of a container for the packaged beverage. For example, when a container filled with a beverage can be subjected to heat sterilization as it is, like a metal can, retort sterilization may be adopted. Meanwhile, when a container, such as a PET bottle or a paper container, which cannot be subjected to retort sterilization, is used, for example, there may be adopted: aseptic filling, which involves subjecting a beverage to heat sterilization in advance under the same sterilization conditions as those described above and filling the beverage into a container having been subjected to sterilization treatment in an aseptic environment; or hot-pack filling.

[Instant Beverage Powder]

An instant beverage powder of the present invention comprises the above-mentioned green tea extract composition, and is drunk as a from-concentrate beverage by being dissolved in a liquid, such as water. Examples of the water may include ion-exchanged water, distilled water, natural water, and tap water. The temperature of the water may be appropriately selected, and is, for example, from 5° C. to 100° C. As used herein, the concept of the "instant beverage powder" encompasses an instant powdered green tea beverage, an instant powdered black tea beverage, an instant powdered oolong tea beverage, and the like. The term "instant powdered green tea beverage" refers to an instant beverage powder containing the above-mentioned green tea extract composition and, as desired, a green tea flavor, and the term "instant powdered black tea beverage" refers to an instant beverage powder containing the above-mentioned green tea extract composition, and a black tea extract and/or a black tea flavor. In addition, the term "instant powdered oolong tea beverage" refers to an instant beverage powder containing the above-mentioned green tea extract composition, and an oolong tea extract and/or an oolong tea flavor.

The blending amount of the green tea extract composition in the instant beverage powder may be appropriately selected. For example, the green tea extract composition may be blended so that the content of the non-polymer catechins per 3 g of the instant beverage powder may be preferably from 280 mg to 1,200 mg, more preferably from 400 mg to 1,200 mg, more preferably from 450 mg to 1,000 mg, even more preferably from 500 mg to 800 mg. Specifically, the content of the green tea extract composition in the instant beverage powder is preferably from 60 mass % to 10 mass %, more preferably from 50 mass % to 15 mass %.

The instant beverage powder of the present invention may comprise a dextrin. The content of the dextrin is an amount that is preferably from 0.1 to 15 times, more preferably from 0.5 to 12 times, even more preferably from 1 to 11 times as large as the mass of the green tea extract composition in the instant beverage powder.

The instant beverage powder of the present invention may comprise ascorbic acid and/or a salt thereof. The salt is not particularly limited as long as the salt is physiologically acceptable, but is preferably an alkali metal salt, such as a potassium salt or a sodium salt, more preferably a sodium salt. The content of the ascorbic acid and/or the salt thereof is an amount that is preferably from 0.1 to 15 times, more preferably from 0.5 to 12 times, even more preferably from 1 to 11 times as large as the mass of the green tea extract composition in the instant beverage powder.

The instant beverage powder of the present invention may further comprise one kind or two or more kinds of additives, such as a sweetener, an antioxidant, a flavor, a fruit juice extract, a fruit piece, fruit powder, a herb, an organic acid, an organic acid salt, an inorganic acid, an inorganic acid salt, a mineral salt, a pH adjuster, and a quality stabilizer, as desired. The blending amount of each of those additives may be appropriately set to the extent that the object of the present invention is not impaired.

The instant beverage powder of the present invention may adopt an appropriate form, and an example thereof may be such a form that a small portion of the instant beverage powder required for a cup is packed. The volume of the cup is preferably from 100 mL to 320 mL, and the volume of the content packed in a small portion may be appropriately set so as to be suitable for the volume of the cup.

Solids of the instant beverage powder of the present invention is preferably 90 mass % or more, more preferably 95 mass % or more, even more preferably 96 mass % or more, from the viewpoints of preservation, microbe prevention, and handling. The upper limit of solids of the instant beverage powder is not particularly limited, and solids may be 100 mass %. As used herein, the term "solids" refers to a residue obtained by removing volatile substances by drying the instant beverage powder in an electric constant-temperature dryer at 105° C. for 3 hours.

The instant beverage powder of the present invention may be produced by an appropriate method, and for example, may be produced by mixing the above-mentioned green tea extract composition with any other component as desired, followed, as necessary, by a process including a known granulation method.

The present invention further discloses the following green tea extract composition, packaged beverage, and instant beverage powder regarding the embodiments described above.

<1>

A green tea extract composition, comprising the following components (A), (B), (C), (D), and (E): (A) non-polymer catechins; (B) a sugar; (C) iron; (D) caffeine; and (E) gallic acid, wherein a content of the non-polymer catechins (A) is from 25 mass % to 45 mass %; a content of the sugar (B) is from 4 mass % to 13 mass %; a mass ratio between the sugar (B) and the caffeine (D), [(D)/(B)], is from 0.2 to 0.8; a mass ratio between the gallic acid (E) and the iron (C), [(E)/(C)], is from 55 to 2,500; and (F) a water content is 10 mass % or less.

<2>

The green tea extract composition according to the above-mentioned item <1>, wherein the content of the non-polymer catechins (A) is preferably 27 mass % or more, more preferably 30 mass % or more, even more preferably 32 mass % or more, and is preferably 43 mass % or less, more preferably 40 mass % or less, even more preferably 38 mass % or less.

<3>

The green tea extract composition according to the above-mentioned item <1> or <2>, wherein the content of the non-polymer catechins (A) is preferably from 27 mass % to 43 mass %, more preferably from 30 mass % to 40 mass %, even more preferably from 32 mass % to 38 mass %.

<4>

The green tea extract composition according to any one of the above-mentioned items <1> to <3>, wherein a ratio of gallate forms in the non-polymer catechins is preferably 57 mass % or less, more preferably 55 mass % or less, more preferably 53 mass % or less, even more preferably 51 mass % or less, and is preferably 10 mass % or more, more preferably 15 mass % or more, more preferably 30 mass % or more, more preferably 35 mass % or more, even more preferably 40 mass % or more.

<5>

The green tea extract composition according to any one of the above-mentioned items <1> to <4>, wherein a ratio of gallate forms in the non-polymer catechins is preferably from 10 mass % to 57 mass %, more preferably from 15 mass % to 57 mass %, more preferably from 30 mass % to 57 mass %, more preferably from 35 mass % to 55 mass %, more preferably from 35 mass % to 53 mass %, even more preferably from 40 mass % to 51 mass %.

<6>
The green tea extract composition according to any one of the above-mentioned items <1> to <5>, wherein the non-polymer catechins (A) are at least one kind selected from epigallocatechin gallate, gallocatechin gallate, epicatechin gallate, catechin gallate, epigallocatechin, gallocatechin, epicatechin, and catechin.

<7>
The green tea extract composition according to any one of the above-mentioned items <1> to <6>, wherein the content of the sugar (B) is preferably 4.5 mass % or more, more preferably 5 mass % or more, even more preferably 5.5 mass % or more, and is preferably 12 mass % or less, more preferably 10 mass % or less, even more preferably 7.5 mass % or less.

<8>
The green tea extract composition according to any one of the above-mentioned items <1> to <7>, wherein the content of the sugar (B) is preferably from 4.5 mass % to 12 mass %, more preferably from 5 mass % to 10 mass %, even more preferably from 5.5 mass % to 7.5 mass %.

<9>
The green tea extract composition according to any one of the above-mentioned items <1> to <8>, wherein the sugar is at least one kind selected from glucose, fructose, and sucrose.

<10>
The green tea extract composition according to any one of the above-mentioned items <1> to <9>, wherein a mass ratio between the non-polymer catechins (A) and the sugar (B), [(B)/(A)], is preferably 0.1 or more, more preferably 0.11 or more, even more preferably 0.12 or more, and is preferably 0.5 or less, more preferably 0.25 or less, even more preferably 0.23 or less.

<11>
The green tea extract composition according to any one of the above-mentioned items <1> to <10>, wherein a mass ratio between the non-polymer catechins (A) and the sugar (B), [(B)/(A)], is preferably from 0.1 to 0.5, more preferably from 0.11 to 0.25, even more preferably from 0.12 to 0.23.

<12>
The green tea extract composition according to any one of the above-mentioned items <1> to <11>, wherein the content of the iron (C) is preferably 0.00005 mass % or more, more preferably 0.00008 mass % or more, even more preferably 0.00009 mass % or more, and is preferably 0.006 mass % or less, more preferably 0.005 mass % or less, even more preferably 0.004 mass % or less.

<13>
The green tea extract composition according to any one of the above-mentioned items <1> to <12>, wherein the content of the iron (C) is preferably from 0.00005 mass % to 0.006 mass %, more preferably from 0.00008 mass % to 0.005 mass %, even more preferably from 0.00009 mass % to 0.004 mass %.

<14>
The green tea extract composition according to any one of the above-mentioned items <1> to <13>, wherein a mass ratio between the sugar (B) and the iron (C), [(C)/(B)], is preferably 0.00008 or more, more preferably 0.0001 or more, more preferably 0.00015 or more, even more preferably 0.0002 or more, and is preferably 0.0008 or less, more preferably 0.0007 or less, more preferably 0.0006 or less, even more preferably 0.0005 or less.

<15>
The green tea extract composition according to any one of the above-mentioned items <1> to <14>, wherein a mass ratio between the sugar (B) and the iron (C), [(C)/(B)], is preferably from 0.00008 to 0.0008, more preferably from 0.0001 to 0.0007, more preferably from 0.00015 to 0.0006, even more preferably from 0.0002 to 0.0005.

<16>
The green tea extract composition according to any one of the above-mentioned items <1> to <15>, wherein the content of the caffeine (D) is preferably 2 mass % or more, more preferably 2.5 mass % or more, even more preferably 3 mass % or more, and is preferably 6 mass % or less, more preferably 5.5 mass % or less, more preferably 5 mass % or less, even more preferably 4 mass % or less.

<17>
The green tea extract composition according to any one of the above-mentioned items <1> to <16>, wherein the content of the caffeine (D) is preferably from 2 mass % to 6 mass %, more preferably from 2.5 mass % to 5.5 mass %, more preferably from 3 mass % to 5 mass %, even more preferably from 3 mass % to 4 mass %.

<18>
The green tea extract composition according to any one of the above-mentioned items <1> to <17>, wherein a mass ratio between the non-polymer catechins (A) and the caffeine (D), [(D)/(A)], is preferably 0.04 or more, more preferably 0.06 or more, more preferably 0.08 or more, even more preferably 0.086 or more, and is preferably 0.17 or less, more preferably 0.15 or less, more preferably 0.14 or less, even more preferably 0.11 or less.

<19>
The green tea extract composition according to any one of the above-mentioned items <1> to <18>, wherein a mass ratio between the non-polymer catechins (A) and the caffeine (D), [(D)/(A)], is preferably from 0.04 to 0.17, more preferably from 0.06 to 0.15, more preferably from 0.08 to 0.13, even more preferably from 0.086 to 0.11.

<20>
The green tea extract composition according to any one of the above-mentioned items <1> to <19>, wherein the mass ratio between the sugar (B) and the caffeine (D), [(D)/(B)], is preferably 0.23 or more, more preferably 0.25 or more, more preferably 0.3 or more, even more preferably 0.35 or more, and is preferably 0.79 or less, more preferably 0.78 or less, more preferably 0.77 or less, more preferably 0.76 or less, more preferably 0.75 or less, even more preferably 0.7 or less.

<21>
The green tea extract composition according to any one of the above-mentioned items <1> to <20>, wherein the mass ratio between the sugar (B) and the caffeine (D), [(D)/(B)], is preferably from 0.23 to 0.79, more preferably from 0.25 to 0.78, more preferably from 0.3 to 0.77, more preferably from 0.35 to 0.76, more preferably from 0.35 to 0.75, even more preferably from 0.35 to 0.7.

<22>
The green tea extract composition according to any one of the above-mentioned items <1> to <21>, wherein a mass ratio between the iron (C) and the caffeine (D), [(C)/(D)], is preferably 0.00003 or more, more preferably 0.00005 or more, more preferably 0.0001 or more, even more preferably 0.0002 or more, and is preferably 0.002 or less, more preferably 0.0017 or less, more preferably 0.0014 or less, even more preferably 0.0011 or less.

<23>
The green tea extract composition according to any one of the above-mentioned items <1> to <22>, wherein a mass ratio between the iron (C) and the caffeine (D), [(C)/(D)], is preferably from 0.00003 to 0.002, more preferably from 0.00005 to 0.0017, more preferably from 0.0001 to 0.0014, even more preferably from 0.0002 to 0.0011.

<24>

The green tea extract composition according to any one of the above-mentioned items <1> to <23>, wherein a content of the gallic acid (E) is preferably 0.05 mass % or more, more preferably 0.1 mass % or more, even more preferably 0.12 mass % or more, and is preferably 7 mass % or less, more preferably 5 mass % or less, more preferably 4 mass % or less, even more preferably 3 mass % or less.

<25>

The green tea extract composition according to any one of the above-mentioned items <1> to <24>, wherein a content of the gallic acid (E) is preferably from 0.05 mass % to 7 mass %, more preferably from 0.05 mass % to 5 mass % more preferably from 0.1 mass % to 4 mass %, even more preferably from 0.12 mass % to 3 mass %.

<26>

The green tea extract composition according to any one of the above-mentioned items <1> to <25>, wherein the mass ratio between the gallic acid (E) and the iron (C), [(E)/(C)], is preferably 60 or more, more preferably 65 or more, more preferably 70 or more, more preferably 80 or more, more preferably 100 or more, more preferably 150 or more, even more preferably 250 or more, and is preferably 2,000 or less, more preferably 1,500 or less, even more preferably 1,000 or less.

<27>

The green tea extract composition according to any one of the above-mentioned items <1> to <26>, wherein the mass ratio between the gallic acid (E) and the iron (C), [(E)/(C)], is preferably from 60 to 2,000, more preferably from 65 to 1,500, more preferably from 70 to 1,000, more preferably from 80 to 1,000, more preferably from 100 to 1,000, more preferably from 150 to 1,000, even more preferably from 250 to 1,000.

<28>

The green tea extract composition according to anyone of the above-mentioned items <1> to <27>, wherein the water content (F) is preferably 8 mass % or less, more preferably 5 mass % or less, and is preferably 0.1 mass % or more, more preferably 1.5 mass % or more.

<29>.

The green tea extract composition according to any one of the above-mentioned items <1> to <28>, wherein the water content (F) is preferably from 0.1 mass % to 10 mass %, more preferably from 0.1 mass % to 8 mass %, more preferably from 0.1 mass % to 5 mass %, even more preferably from 1.5 mass % to 5 mass %.

<30>

The green tea extract composition according to any one of the above-mentioned items <1> to <29>, wherein an absolute value ($\Delta L^*$) of a difference between an $L^*$ value of the green tea extract composition after storage at 65° C. for 2 days and an $L^*$ value of the green tea extract composition before start of the storage (for example, immediately after production) is preferably less than 10, more preferably less than 9, more preferably less than 8, even more preferably less than 7.5.

<31>

The green tea extract composition according to any one of the above-mentioned items <1> to <30>, wherein an absolute value ($\Delta a^*$) of a difference between an $a^*$ value of the green tea extract composition after storage at 65° C. for 2 days and an $a^*$ value of the green tea extract composition before start of the storage (for example, immediately after production) is preferably 5 or less, more preferably 4 or less, more preferably 3 or less, even more preferably 2 or less.

<32>

The green tea extract composition according to any one of the above-mentioned items <1> to <31>, wherein the green tea extract composition is obtained by bringing hot water into contact with surfaces of raw tea leaves, then extracting the tea leaves with water, and subjecting the resultant green tea extract solution to tannase treatment.

<33>

A packaged beverage, comprising the green tea extract composition of any one of the above-mentioned items <1> to <32>.

<34>

The packaged beverage according to the above-mentioned item <33>, wherein the green tea extract composition is blended so that the content of the non-polymer catechins (A) in the packaged beverage may be preferably from 0.1 mass % to 0.3 mass %, more preferably from 0.12 mass % to 0.2 mass %.

<35>

The packaged beverage according to the above-mentioned item <33> or <34>, wherein the packaged beverage has a pH (25° C.) of preferably from 2 to 7, more preferably from 2.5 to 6.5, even more preferably from 3 to 6.

<36>

The packaged beverage according to any one of the above-mentioned items <33> to <35>, wherein the packaged beverage is preferably a tea beverage or a non-tea-based beverage.

<37>

The packaged beverage according to the above-mentioned item <36>, wherein the tea beverage is preferably a green tea beverage, an oolong tea beverage, or a black tea beverage.

<38>

The packaged beverage according to the above-mentioned item <36>, wherein the non-tea-based beverage is preferably a green tea extract composition-containing non-alcohol beverage (for example, a fruit juice, a vegetable juice, a sports beverage, an isotonic beverage, enhanced water, bottled water, near water, a coffee beverage, an energy drink, or a drink for beauty), or a green tea extract composition-containing alcohol beverage (for example, beer, wine, Japanese sake, a plum liquor, a sparkling liquor, whisky, brandy, a clear liquor, rum, gin, or a liqueur).

<39>

The packaged beverage according to any one of the above-mentioned items <33> to <38>, preferably further comprising one kind or two or more kinds of additives selected from a flavor, a vitamin, a mineral, an antioxidant, various esters, pigments, an emulsifier, a preservative, a seasoning, an acidulant, a fruit juice extract, a vegetable extract, a nectar extract, and a quality stabilizer.

<40>

The packaged beverage according to any one of the above-mentioned items <33> to <39>, wherein the packaged beverage is preferably filled into a molded container mainly formed of polyethylene terephthalate (so-called PET bottle), a metal can, a paper container composited with a metal foil or a plastic film, or a bottle.

<41>

The packaged beverage according to any one of the above-mentioned items <33> to <40>, wherein the packaged beverage is preferably subjected to heat sterilization.

<42>
The packaged beverage according to the above-mentioned item <41>, wherein the heat sterilization preferably complies with a condition specified by an applicable regulation (Food Sanitation Act in Japan), and is more preferably retort sterilization, high-temperature short-time sterilization (HTST), or ultrahigh-temperature sterilization (UHT).
<43>.
An instant beverage powder, comprising the green tea extract composition of any one of the above-mentioned items <1> to <32>.
<44>
The instant beverage powder according to the above-mentioned item <43>, wherein the instant beverage powder is preferably an instant powdered green tea beverage, an instant powdered black tea beverage, or an instant powdered oolong tea beverage.
<45>
The instant beverage powder according to the above-mentioned item <43> or <44>, wherein the green tea extract composition is blended so that the content of the non-polymer catechins (A) per 3 g of the instant beverage powder may be preferably from 280 mg to 1,200 mg, more preferably from 400 mg to 1,200 mg, more preferably from 450 mg to 1,000 mg, even more preferably from 500 mg to 800 mg.
<46>
The instant beverage powder according to any one of the above-mentioned items <43> to <45>, preferably further comprising a dextrin.
<47>
The instant beverage powder according to the above-mentioned item <46>, wherein a content of the dextrin is an amount that is preferably from 0.1 to 15 times, more preferably from 0.5 to 12 times, even more preferably from 1 to 11 times as large as a mass of the green tea extract composition in the instant beverage powder.
<48>
The instant beverage powder according to any one of the above-mentioned items <43> to <47>, preferably further comprising ascorbic acid and/or a salt thereof.
<49>
The instant beverage powder according to the above-mentioned item <48>, wherein a content of the ascorbic acid and/or the salt thereof is an amount that is preferably from 0.1 to 15 times, more preferably from 0.5 to 12 times, even more preferably from 1 to 11 times as large as a mass of the green tea extract composition in the instant beverage powder.
<50>
The instant beverage powder according to any one of the above-mentioned items <43> to <49>, preferably further comprising one kind or two or more kinds of additives selected from a sweetener, an antioxidant, a flavor, a fruit juice extract, a fruit piece, fruit powder, a herb, an organic acid, an organic acid salt, an inorganic acid, an inorganic acid salt, a mineral salt, a pH adjuster, and a quality stabilizer.
<51>
The instant beverage powder according to any one of the above-mentioned items <43> to <50>, wherein the instant beverage powder preferably has such a form that a small portion of the instant beverage powder required for a cup is packed.
<52>
The instant beverage powder according to any one of the above-mentioned items <43> to <51>, wherein solids of the instant beverage powder is preferably 90 mass % or more, more preferably 95 mass % or more, even more preferably 96 mass % or more.

EXAMPLES

1. Analysis of Non-Polymer Catechins, Caffeine, and Gallic Acid

A sample dissolved and diluted with pure water was measured by a gradient method using a high-performance liquid chromatograph (model SCL-10AVP) manufactured by Shimadzu Corporation having mounted thereon an octadecyl group-introduced packed column for liquid chromatography (L-column™ ODS, 4.6 mmφ×250 mm: manufactured by Chemicals Evaluation and Research Institute, Japan) at a column temperature of 35° C. The measurement was carried out using a distilled water solution containing 0.1 mol/L acetic acid as a mobile phase solution A and an acetonitrile solution containing 0.1 mol/L acetic acid as a mobile phase solution B under the conditions of a flow rate of 1 mL/min, a sample injection volume of 10 µL, and a UV detector wavelength of 280 nm. The gradient conditions are as described below.

Concentration Gradient Condition (vol %)

| Time | Solution A concentration | Solution B concentration |
| --- | --- | --- |
| 0 min | 97% | 3% |
| 5 min | 97% | 3% |
| 37 min | 80% | 20% |
| 43 min | 80% | 20% |
| 43.5 min | 0% | 100% |
| 48.5 min | 0% | 100% |
| 49 min | 97% | 3% |
| 60 min | 97% | 3% |

2. Measurement of Content of Sugar
1) Preparation of Sample

A sample was diluted with pure water, and then was sequentially passed through 0.5 g of a silica-based packing material (BONDELUTE C18, manufactured by Varian Inc.), 0.5 g of a strongly basic anion-exchange resin (SAX, manufactured by Varian Inc.), and 0.5 g of a strongly acidic cation-exchange resin (SCX, manufactured by Varian Inc.). Thus, a sample was prepared.

2) Measurement Apparatus

A high-performance liquid chromatograph (D-2000, manufactured by Hitachi, Ltd.) was used.

3) Measurement Conditions

A strong anion-exchanged column (TSKgel Suger Axi, manufactured by Tosoh Corporation) was mounted onto the high-performance liquid chromatograph, and measurement was performed at a column temperature of 70° C. by a post-column reaction method. A distilled water solution containing 0.5 mol/L boric acid was used as a mobile phase solution, and a flow rate and a sample injection volume were set to 0.4 mL/min and 10 µL, respectively. In addition, a distilled water solution containing 1% of arginine and 3% of boric acid was used as a post-column reaction reagent, and a reaction was performed at 150° C. A detector used was a fluorescence detector, and detection was performed under the following conditions: an excitation wavelength of 320 nm and a fluorescence detection wavelength of 430 nm.

3. Analysis of Iron

A sample was dissolved and diluted with a 0.1 M nitric acid aqueous solution, and then subjected to measurement by a graphite furnace method using anatomic absorption spectrophotometer (Z-2000, manufactured by Hitachi, Ltd.). 20 µL of the diluted sample was dried at from 80° C. to 140° C. for 40 seconds, ashed at 500° C. for 20 seconds, and atomized at 2,200° C. for 5 seconds. Then, measurement was performed at a measurement wavelength of 248.3 nm with a slit of 0.2 mm.

4. Measurement of Water Content

About 1 g of a sample was weighed and dried at 105° C. for 3 hours, and the sample after the drying was weighed. A water content (mass %) was calculated from the mass of the sample before the drying and that of the sample after the drying.

5. Measurement of Change in Color

A powdered or paste sample was placed in a 30φ circular cell and measured for its L* value and a* value in an L*a*b* color system with a spectrophotometer (model: Color Meter ZE-2000, manufactured by Nippon Denshoku Industries Co., Ltd.) (Note that the measurement was performed by reflection measurement). The absolute values (ΔL*) and (Δa*) of differences between the L* value and a* value of a green tea extract composition after storage at 65° C. for 2 days, and the L* value and a* value of the green tea extract composition immediately after production were determined.

6. Sensory Evaluation

An expert panel of four members drunk each packaged beverage and evaluated for its unpleasant taste and flavor by the criteria described below. Then, they determined final scores through discussion.

Evaluation Criteria

Unpleasant taste and flavor were evaluated on a 5-point scale in terms of dry rough tongue, harshness, and foreign taste that was unlikely in green tea. As used herein, the term "dry rough tongue" refers to irritating taste that makes a tongue dry.

The score of each of dry rough tongue and harshness of a packaged beverage of Example 7 was defined as "1", and the score of foreign taste that was unlikely in green tea of a packaged beverage of Example 11 was defined as "1". Meanwhile, the score of each of dry rough tongue, harshness, and foreign taste that was unlikely in green tea of a packaged beverage of Comparative Example 3 was defined as "5". Specific evaluation criteria are as described below.

Dry Rough Tongue

5: Dry rough tongue is strongly sensed.
4: Dry rough tongue is sensed.
3: Dry rough tongue is slightly sensed.
2: Dry rough tongue is hardly sensed.
1: No Dry rough tongue is sensed.

Harshness

5: Harshness is strongly sensed.
4: Harshness is sensed.
3: Harshness is slightly sensed.
2: Harshness is hardly sensed.
1: No harshness is sensed.

Foreign Taste that is Unlikely in Green Tea

5: Foreign taste that is unlikely in green tea is strongly sensed.
4: Foreign taste that is unlikely in green tea is sensed.
3: Foreign taste that is unlikely in green tea is slightly sensed.
2: Foreign taste that is unlikely in green tea is hardly sensed.
1: No foreign taste that is unlikely in green tea is sensed.

Example 1

A green tea extract composition was produced by the following procedure.

<Hot Water Treatment>

Plucked raw tea leaves were immersed in ion-exchanged water at 90° C. for 180 seconds and then filtered with a metal mesh, and the washing solution of tea leaf was discarded. The amount of the ion-exchanged water used was 5 in terms of mass ratio of hot water/raw tea leaves.

<CTC Processing>

The tea leaves that had been immersed in the hot water were drained of water, subjected to crushing, tearing, and curling (CTC) processing, and dried to provide dry tea leaves.

<Extraction>

The dry tea leaves were subjected to stirring and extraction with ion-exchanged water at 90° C. for 10 minutes, and then filtered with a metal mesh to provide a green tea extract solution A. The amount of the ion-exchanged water used was 75 in terms of mass ratio of water/raw tea leaves.

<Solid-Liquid Separation>

A pencil-type module (manufactured by Asahi Kasei Chemicals Corporation, pore size: 0.45 µm, material: polyvinylidene fluoride) serving as a microfiltration module was mounted onto a solid-liquid separator, and the resultant green tea extract solution A was subjected to pressure filtration at a gauge pressure of 100 kPa and a temperature of 25° C. to provide a green tea extract solution B.

<Tannase Treatment>

The resultant green tea extract solution B was adjusted with ion-exchanged water so as to have a concentration of 3 mass %. Tannase KT05 (manufactured by Kikkoman Corporation) was added to the ion-exchanged water in a concentration of 40 ppm with respect to the green tea extract solution under the stirring conditions of 25° C. and 150 r/min, and an enzyme reaction was completed 10 minutes later. Then, a stainless-steel container was immersed into a hot bath at 95° C. and held at 90° C. for 10 minutes to completely deactivate enzyme activity. Thus, a green tea extract solution C was obtained.

<Concentration/Spray Drying>

The resultant green tea extract solution C was concentrated in an evaporator, and then a powdered green tea extract composition was obtained through the use of a spray dryer.

The resultant powdered green tea extract composition was analyzed. In addition, the powdered green tea extract composition was diluted with ion-exchanged water so as to have a concentration of non-polymer catechins of 0.175 g/100 mL, and then the resultant was filled into a container and sterilized at 138° C. for 30 seconds to prepare a packaged beverage, which was subjected to the sensory evaluation. The results are collectively shown in Table 1.

Example 2

A powdered green tea extract composition was obtained by the same procedure as in Example 1 except that, in Example 1, the enzyme reaction time of the tannase treatment was set to 15 minutes. After that, the resultant powdered green tea extract composition was analyzed, and then a packaged beverage was prepared by the same procedure as in Example 1, and subjected to the sensory test. The results are shown in Table 1.

Example 3

A powdered green tea extract composition was obtained by the same procedure as in Example 1 except that, in Example 1, the extraction time was set to 30 minutes and the enzyme reaction time of the tannase treatment was set to 15 minutes. After that, the resultant powdered green tea extract composition was analyzed, and then a packaged beverage was prepared by the same procedure as in Example 1, and subjected to the sensory test. The results are shown in Table 1.

Example 4

A powdered green tea extract composition was obtained by the same procedure as in Example 1 except that, in Example 1, the extraction time was set to 20 minutes, the enzyme reaction tame of the tannase treatment was set to 10 minutes, and the enzyme was added in a concentration of 60 ppm with respect to the green tea extract solution. After that, the resultant powdered green tea extract composition was analyzed, and then a packaged beverage was prepared by the same procedure as in Example 1, and subjected to the sensory test. The results are shown in Table 1.

Example 5

A powdered green tea extract composition was obtained by the same procedure as in Example 1 except that, in Example 1, the extraction time was set to 30 minutes, the enzyme reaction time of the tannase treatment was set to 20 minutes, and the enzyme was added in a concentration of 60 ppm with respect to the green tea extract solution. After that, the resultant powdered green tea extract composition was analyzed, and then a packaged beverage was prepared by the same procedure as in Example 1, and subjected to the sensory test. The results are shown in Table 1.

Example 6

A powdered green tea extract composition was obtained by the same procedure as in Example 1 except that, in Example 1, the extraction time was set to 30 minutes, the enzyme reaction of the tannase treatment was set to 30 minutes, and the enzyme was added in a concentration of 60 ppm with respect to the green tea extract solution. After that, the resultant powdered green tea extract composition was analyzed, and then a packaged beverage was prepared by the same procedure as in Example 1, and subjected to the sensory test. The results are shown in Table 1.

Example 7

A powdered green tea extract composition was obtained by the same procedure as in Example 1 except that, in Example 1, the extraction time was set to 10 minutes, the enzyme reaction time of the tannase treatment was set to 10 minutes, and the enzyme was added in a concentration of 60 ppm with respect to the green tea extract solution. After that, the resultant powdered green tea extract composition was analyzed, and then a packaged beverage was prepared by the same procedure as in Example 1, and subjected to the sensory test. The results are shown in Table 1.

Example 8

A powdered green tea extract composition was obtained by the same procedure as in Example 1 except that, in Example 1, the immersion time in the hot water was changed to 120 seconds, the amount of the ion-exchanged water used at the time of the extraction was set to 25 in terms of mass ratio of hot water/raw tea leaves, the extraction temperature was set to 75° C., and the tannase treatment was not performed. After that, the resultant powdered green tea extract composition was analyzed, and then a packaged beverage was prepared by the same procedure as in Example 1, and subjected to the sensory test. The results are shown in Table 1.

Example 9

A powdered green tea extract composition was obtained by the same procedure as in Example 1 except that, in Example 1, the extraction temperature was changed to 75° C. and the tannase treatment was not performed. After that, the resultant powdered green tea extract composition was analyzed, and then a packaged beverage was prepared by the same procedure as in Example 1, and subjected to the sensory test. The results are shown in Table 1.

Example 10

A powdered green tea extract composition s obtained by the same procedure as in Example 1 except that, in Example 1, the tannase treatment was not performed. After that, the resultant powdered green tea extract composition was analyzed, and then a packaged beverage was prepared by the same procedure as in Example 1, and subjected to the sensory test. The results are shown in Table 1.

Example 11

A powdered green tea extract composition was obtained by the same procedure as in Example 1 except that, in Example 1, the extraction time was changed to 30 minutes and the tannase treatment was not performed. After that, the resultant powdered green tea extract composition was analyzed, and then a packaged beverage was prepared by the same procedure as in Example 1, and subjected to the sensory test. The results are shown in Table 1.

Example 12

A powdered green tea extract composition was obtained by the same procedure as in Example 5 except that, in Example 5, the enzyme reaction time of the tannase treatment was set to 35 minutes. After that, the resultant powdered green tea extract composition was analyzed, and then a packaged beverage was prepared by the same procedure as in Example 1, and subjected to the sensory test. The results are shown in Table 1.

Example 13

A powdered green tea extract composition was obtained by the same procedure as in Example 5 except that, in Example 5, the enzyme reaction time of the tannase treatment was set to 45 minutes. After that, the resultant powdered green tea extract composition was analyzed, and then a packaged beverage was prepared by the same procedure as in Example 1, and subjected to the sensory test. The results are shown in Table 1.

Example 14

A powdered green tea extract composition was obtained by the same procedure as in Example 10 except that a concentrated solution was obtained by the same procedure as in Example 10, and then gallic acid was added thereto so as to adjust the gallic acid amount to that shown in Table 1. After that, the resultant powdered green tea extract composition was analyzed, and then a packaged beverage was prepared by the same procedure as in Example 1, and subjected to the sensory test. The results are shown in Table 1.

Example 15

A powdered green tea extract composition was obtained by the same procedure as in Example 10 except that a concentrated solution was obtained by the same procedure as in Example 10, and then gallic acid was added thereto so as to adjust the gallic acid amount to that shown in Table 1. After that, the resultant powdered green tea extract composition was analyzed, and then a packaged beverage was prepared by the same procedure as in Example 1, and subjected to the sensory test. The results are shown in Table 1.

Example 16

A powdered green tea extract composition was obtained by the same procedure as in Example 10 except that, in Example 10, Chinese green tea was used as the material tea leaves. After that, the resultant powdered green tea extract composition was analyzed, and then a packaged beverage was prepared by the same procedure as in Example 1, and subjected to the sensory test. The results are shown in Table 1.

Comparative Example 1

A powdered green tea extract composition was obtained by the same procedure as in Example 1 except that, in Example 1, the extraction temperature was changed to 60° C., the amount of the ion-exchanged water used at the time of the extraction was set to 120 in terms of mass ratio of water/raw tea leaves, and the tannase treatment was not performed. After that, the resultant powdered green tea extract composition was analyzed, and then a packaged beverage was prepared by the same procedure as in Example 1, and subjected to the sensory test. The results are shown in Table 1.

Comparative Example 2

A catechin composition was obtained in accordance with the description of Example 3 of WO 2004/037022 A1 except that, in Example 3 of WO 2004/037022 A1, the amount of activated carbon (KURARAY COAL GLC, manufactured by Kuraray Chemical Co., Ltd.) added to a filtrate was changed from 30 g to 50 g, and the amount of acid clay (MIZUKA ACE #600, manufactured by Mizusawa Industrial Chemicals, Ltd.) added was changed from 30 g to 55 g. That is, the catechin composition was obtained by the following method: a green tea extract was dissolved in a mixed solution of an organic solvent and water, and then the resultant was brought into contact with the activated carbon and the acid clay, followed by the removal of the organic solvent.

After that, the resultant catechin composition was concentrated and spray-dried by the same procedure as in Example 1 to provide a powdered green tea extract composition. After that, the resultant powdered green tea extract composition was analyzed, and then a packaged beverage was prepared by the same procedure as in Example 1, and subjected to the sensory test. The results are shown in Table 1.

Comparative Example 3

A powdered green tea extract composition was obtained by the same procedure as in Comparative Example 1 except that the hot water treatment was not performed, the extraction temperature was changed to 75° C., and the amount of the ion-exchanged water used at the time of the extraction was set to 75 in terms of mass ratio of water/raw tea leaves. After that, the resultant powdered green tea extract composition was analyzed, and then a packaged beverage was prepared by the same procedure as in Example 1, and subjected to the sensory test. The results are shown in Table 2.

TABLE 1

| | | | Example | | | | | | |
|---|---|---|---|---|---|---|---|---|---|
| | | | 1 | 2 | 3 | 4 | 5 | 6 | 7 |
| Analysis of green tea extract composition | (A) Non-polymer catechins | [Mass %] | 35 | 35 | 35 | 36 | 34 | 32 | 36 |
| | (B) Sugar | [Mass %] | 4.1 | 7.1 | 7.0 | 6.8 | 6.9 | 6.8 | 6.8 |
| | (C) Fe | [Mass %] | 0.00155 | 0.00156 | 0.00348 | 0.00176 | 0.00214 | 0.00335 | 0.00137 |
| | (D) Caffeine | [Mass %] | 3.0 | 3.0 | 3.4 | 3.2 | 3.3 | 3.3 | 3.2 |
| | (E) Gallic acid | [Mass %] | 0.53 | 0.78 | 0.76 | 1.14 | 2.09 | 2.92 | 1.15 |
| | (B) Sugar/(A) Non-polymer catechins | [—] | 0.11 | 0.20 | 0.20 | 0.19 | 0.20 | 0.21 | 0.19 |
| | (D) Caffeine/(A) Non-polymer catechins | [—] | 0.085 | 0.086 | 0.097 | 0.090 | 0.095 | 0.104 | 0.088 |
| | (C) Fe/(B) Sugar | [—] | 0.00038 | 0.00022 | 0.00050 | 0.00026 | 0.00031 | 0.00050 | 0.00020 |
| | (D) Caffeine/(B) Sugar | [—] | 0.74 | 0.42 | 0.48 | 0.48 | 0.47 | 0.50 | 0.47 |
| | (C) Fe/(D) Caffeine | [—] | 0.00052 | 0.00052 | 0.00103 | 0.00054 | 0.00066 | 0.00100 | 0.00043 |

TABLE 1-continued

|  |  |  | | | | | | | |
|---|---|---|---|---|---|---|---|---|---|
|  | (E) Gallic acid/(C)Fe | [—] | 341 | 501 | 218 | 647 | 976 | 873 | 839 |
|  | Ratio of gallate forms in non-polymer catechins | [Mass %] | 51 | 50 | 49 | 47 | 40 | 35 | 47 |
| Evaluation | (F) Water content | [Mass %] | 6.3 | 7.2 | 3.9 | 3.2 | 3.7 | 4.5 | 3.0 |
|  | Dry rough tongue |  | 2 | 1 | 3 | 1 | 1 | 2 | 1 |
|  | Harshness |  | 3 | 2 | 4 | 2 | 2 | 2 | 1 |
|  | Foreign taste that is unlikely in green tea |  | 2 | 2 | 2 | 2 | 3 | 3 | 2 |
|  | Change in color ($\Delta L^*$) |  | 7.1 | 6.0 | 1.0 | 0.2 | 0.1 | 2.1 | 0.6 |
|  | Change in color ($\Delta a^*$) |  | 2.7 | 1.9 | 0.5 | 0.5 | 0.5 | 0.8 | 0.7 |

| | | | Example | | | | | |
|---|---|---|---|---|---|---|---|---|
| | | | 8 | 9 | 10 | 11 | 12 | 13 |
| Analysis of green tea extract composition | (A) Non-polymer catechins | [Mass %] | 32 | 38 | 37 | 35 | 34 | 31 |
| | (B) Sugar | [Mass %] | 7.6 | 4.5 | 6.8 | 7.0 | 6.6 | 7.0 |
| | (C) Fe | [Mass %] | 0.00149 | 0.00095 | 0.00137 | 0.00350 | 0.00320 | 0.00311 |
| | (D) Caffeine | [Mass %] | 4.5 | 3.4 | 3.2 | 3.4 | 2.8 | 3.3 |
| | (E) Gallic acid | [Mass %] | 0.11 | 0.13 | 0.18 | 0.24 | 3.6 | 6.7 |
| | (B) Sugar/(A) Non-polymer catechins | [—] | 0.24 | 0.12 | 0.18 | 0.20 | 0.19 | 0.22 |
| | (D) Caffeine/(A) Non-polymer catechins | [—] | 0.139 | 0.090 | 0.087 | 0.096 | 0.082 | 0.107 |
| | (C) Fe/(B) Sugar | [—] | 0.00020 | 0.00021 | 0.00020 | 0.00050 | 0.00049 | 0.00045 |
| | (D) Caffeine/(B) Sugar | [—] | 0.59 | 0.76 | 0.48 | 0.48 | 0.43 | 0.48 |
| | (C) Fe/(D) Caffeine | [—] | 0.00033 | 0.00028 | 0.00042 | 0.00104 | 0.00114 | 0.00094 |
| | (E) Gallic acid/(C)Fe | [—] | 74 | 135 | 132 | 69 | 1,127 | 2,151 |
| | Ratio of gallate forms in non-polymer catechins | [Mass %] | 48 | 54 | 54 | 53 | 31 | 14 |
| Evaluation | (F) Water content | [Mass %] | 2.8 | 4.1 | 2.7 | 3.7 | 5.4 | 3.9 |
| | Dry rough tongue | | 4 | 3 | 3 | 3 | 3 | 3 |
| | Harshness | | 3 | 3 | 3 | 4 | 2 | 2 |
| | Foreign taste that is unlikely in green tea | | 1 | 1 | 1 | 1 | 3 | 4 |
| | Change in color ($\Delta L^*$) | | 6.9 | 5.3 | 0.5 | 5.4 | 0.70 | 2.9 |
| | Change in color ($\Delta a^*$) | | 4.9 | 2.9 | 0.6 | 1.9 | 0.5 | 1.3 |

| | | | Example | | | Comparative Example | |
|---|---|---|---|---|---|---|---|
| | | | 14 | 15 | 16 | 1 | 2 |
| Analysis of green tea extract composition | (A) Non-polymer catechins | [Mass %] | 37 | 38 | 36 | 32 | 43 |
| | (B) Sugar | [Mass %] | 5.7 | 4.4 | 12.0 | 6.6 | 13.0 |
| | (C) Fe | [Mass %] | 0.00093 | 0.00094 | 0.00183 | 0.00120 | 0.00100 |
| | (D) Caffeine | [Mass %] | 3.4 | 3.4 | 3.1 | 4.1 | 2.5 |
| | (E) Gallic acid | [Mass %] | 1.9 | 1.0 | 0.2 | 0.06 | 0.28 |
| | (B) Sugar/(A) Non-polymer catechins | [—] | 0.15 | 0.12 | 0.34 | 0.21 | 0.30 |
| | (D) Caffeine/(A) Non-polymer catechins | [—] | 0.091 | 0.091 | 0.086 | 0.129 | 0.057 |
| | (C) Fe/(B) Sugar | [—] | 0.00016 | 0.00021 | 0.00015 | 0.00018 | 0.00008 |
| | (D) Caffeine/(B) Sugar | [—] | 0.59 | 0.78 | 0.25 | 0.62 | 0.19 |
| | (C) Fe/(D) Caffeine | [—] | 0.00027 | 0.00027 | 0.00060 | 0.00029 | 0.00041 |
| | (E) Gallic acid/(C)Fe | [—] | 2,031 | 1,016 | 85 | 53 | 276 |
| | Ratio of gallate forms in non-polymer catechins | [Mass %] | 54 | 54 | 48 | 41 | 50 |
| Evaluation | (F) Water content | [Mass %] | 4.6 | 4.4 | 3.0 | 3.4 | 7.6 |
| | Dry rough tongue | | 3 | 3 | 2 | 5 | 2 |
| | Harshness | | 3 | 3 | 3 | 4 | 3 |

TABLE 1-continued

|  | | | | | |
|---|---|---|---|---|---|
| Foreign taste that is unlikely in green tea | 2 | 2 | 2 | 3 | 4 |
| Change in color (ΔL*) | 2.4 | 2.6 | 3.3 | 10.7 | 19.5 |
| Change in color (Δa*) | 0.8 | 1.5 | 2.2 | 5.4 | 8.8 |

TABLE 2

| | | | Comparative Example 3 |
|---|---|---|---|
| Analysis of green tea extract composition | (A) Non-polymer catechins | [Mass %] | 32 |
| | (B) Sugar | [Mass %] | 7.0 |
| | (C) Fe | [Mass %] | 0.00072 |
| | (D) Caffeine | [Mass %] | 5.9 |
| | (E) Gallic acid | [Mass %] | 0.71 |
| | (B) Sugar/(A) Non-polymer catechins | [—] | 0.22 |
| | (D) Caffeine/(A) Non-polymer catechins | [—] | 0.183 |
| | (C) Fe/(B) Sugar | [—] | 0.00010 |
| | (D) Caffeine/(B) Sugar | [—] | 0.84 |
| | (C) Fe/(D) Caffeine | [—] | 0.00012 |
| | (E) Gallic acid/(C) Fe | [—] | 992 |
| | Ratio of gallate forms in non-polymer catechins | [Mass %] | 50 |
| | (F) Water content | [Mass %] | 4.5 |
| Evaluation | Dry rough tongue | | 5 |
| | Harshness | | 5 |
| | Foreign taste that is unlikely in green tea | | 5 |
| | Change in color (ΔL*) | | 12.7 |

It found from Table 1 that, when the respective contents of the non-polymer catechins (A) and the sugar (B), the respective mass ratio among the sugar (B), the iron (C), the caffeine (D) and (E), as well as the water content are controlled to specific amounts, the resultant green tea extract composition has satisfactory taste and flavor by virtue of reduced unpleasant taste and flavor, such as dry rough tongue and harshness, and reduced foreign taste that is unlikely in green tea, and moreover hardly exhibits a change in color during storage (Examples 1 to 16).

Respective components described in Formulation Examples 1 to 3 below were mixed to prepare instant beverage powder having blended therein green tea extract compositions.

Formulation Example 1

Instant Powdered Green Tea Beverage

| | |
|---|---|
| Green tea extract composition obtained in Example 1 | 30 mass % |
| Dextrin | 68 mass % |
| Sodium ascorbate | 2 mass % |

Formulation Example 2

Instant Powdered Black Tea Beverage

| | |
|---|---|
| Green tea extract composition obtained in Example 1 | 30 mass % |
| Powdered black tea extract | 5 mass % |
| Dextrin | 63 mass % |
| Sodium ascorbate | 2 mass % |

Formulation Example 3

Instant Powdered Oolong Tea Beverage

| | |
|---|---|
| Green tea extract composition obtained in Example 1 | 30 mass % |
| Powdered oolong tea extract | 5 mass % |
| Dextrin | 63 mass % |
| Sodium ascorbate | 2 mass % |

The invention claimed is:

1. A green tea extract composition, comprising the following components (A), (B), (C), (D), and (E):
   (A) non-polymer catechins;
   (B) a sugar;
   (C) iron;
   (D) caffeine; and
   (E) gallic acid,
   wherein
   a content of the non-polymer catechins (A) is from 25 mass % to 45 mass %;
   a content of the sugar (B) is from 4 mass % to 13 mass %;
   a mass ratio between the sugar (B) and the caffeine (D), [(D)/(B)], is from 0.2 to 0.8;
   a mass ratio between the gallic acid (E) and the iron (C), [(E)/(C)], is from 55 to 2,500; and
   (F) a water content is 10 mass % or less.

2. The green tea extract composition according to claim 1, wherein a mass ratio between the sugar (B) and the iron (C), [(C)/(B)], is from 0.00008 to 0.0008.

3. The green tea extract composition according to claim 1, wherein a content of the iron (C) is from 0.00005 mass % to 0.006 mass %.

4. The green tea extract composition according to claim 1, wherein a content of the gallic acid (E) is from 0.05 mass % to 7 mass %.

5. The green tea extract composition according to claim 1, wherein a mass ratio between the iron (C) and the caffeine (D), [(C)/(D)], is from 0.00003 to 0.002.

6. The green tea extract composition according to claim 1, wherein a mass ratio between the non-polymer catechins (A) and the sugar (B), [(B)/(A)], is from 0.1 to 0.5.

7. The green tea extract composition according to claim 1, wherein a mass ratio between the non-polymer catechins (A) and the caffeine (D), [(D)/(A)], is from 0.04 to 0.17.

8. The green tea extract composition according to claim 1, wherein a ratio of gallate forms in the non-polymer catechins is from 10 mass % to 57 mass %.

9. An instant beverage powder, comprising the green tea extract composition of claim 1 blended therein.

* * * * *